US010846568B2

(12) United States Patent
Ko et al.

(10) Patent No.: US 10,846,568 B2
(45) Date of Patent: Nov. 24, 2020

(54) DEEP LEARNING-BASED AUTOMATIC GESTURE RECOGNITION METHOD AND SYSTEM

(71) Applicant: Korea Electronics Technology Institute, Seongnam-si (KR)

(72) Inventors: Sang Ki Ko, Suwon-si (KR); Choong Sang Cho, Seongnam-si (KR); Hye Dong Jung, Seoul (KR); Young Han Lee, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 200 days.

(21) Appl. No.: 16/147,962

(22) Filed: Oct. 1, 2018

(65) Prior Publication Data

US 2020/0005086 A1 Jan. 2, 2020

(30) Foreign Application Priority Data

Jun. 29, 2018 (KR) .................. 10-2018-0075133

(51) Int. Cl.
*G06K 9/62* (2006.01)
*G06K 9/00* (2006.01)
*G06K 9/42* (2006.01)
*G06K 9/46* (2006.01)

(52) U.S. Cl.
CPC ....... *G06K 9/6257* (2013.01); *G06K 9/00335* (2013.01); *G06K 9/42* (2013.01); *G06K 9/4604* (2013.01); *G06K 9/6262* (2013.01)

(58) Field of Classification Search
CPC .... G06K 9/6257; G06K 9/00335; G06K 9/42; G06K 9/6262; G06K 9/00375; G06F 3/013; G01C 11/30

USPC ........................................................ 382/159
See application file for complete search history.

(56) References Cited

U.S. PATENT DOCUMENTS

| 9,646,201 | B1* | 5/2017 | Horowitz | G06T 7/246 |
| 2014/0270540 | A1* | 9/2014 | Spector | G06T 7/579 |
| | | | | 382/199 |
| 2015/0139545 | A1* | 5/2015 | Guntur | G06K 9/4642 |
| | | | | 382/170 |
| 2015/0253864 | A1* | 9/2015 | Parkhomenko | G06F 3/017 |
| | | | | 345/156 |
| 2015/0278589 | A1* | 10/2015 | Mazurenko | G06K 9/00375 |
| | | | | 382/103 |

(Continued)

OTHER PUBLICATIONS

Korean Office Action dated Nov. 29, 2019 in corresponding Korean Patent Application No. 10-2018-0075133 (3 pages in English, 5 pages in Korean).

(Continued)

*Primary Examiner* — Ali Bayat
(74) *Attorney, Agent, or Firm* — NSIP Law (57) ABSTRACT

Deep learning-based automatic gesture recognition method and system are provided. The training method according to an embodiment includes: extracting a plurality of contours from an input image; generating training data by normalizing pieces of contour information forming each of the contours; and training an AI model for gesture recognition by using the generated training data. Accordingly, robust and high-performance automatic gesture recognition can be performed, without being influenced by an environment and a condition even while using less training data.

20 Claims, 9 Drawing Sheets

(56) References Cited

U.S. PATENT DOCUMENTS

2016/0026857 A1* 1/2016 Petyushko ......... G06K 9/00389
382/103
2019/0362149 A1* 11/2019 Mukhopadhyay ..........................
G06K 9/00671

OTHER PUBLICATIONS

Moon et al., "CNN-Based Hand Gesture Recognition for Wearable Applications," Mar. 2018, vol. 23, No. 2, 7 pages.
Alouini et al., "What are the most common data normalization methods used in machine learning?" Mar. 16, 2017, Internet: <URL:www.quora.com/What-are-the-most-common-data-normalization-methods-used-in-machine-learning>(3 pages in English).
Kim, "Inflating Data for Convolutional Neural Network Models," Jun. 10, 2017, Internet:<URL:tykimos.github.io/2017/06/10/CNN_Data_Augmentation/>(30 pages in English).

* cited by examiner

Probability of prediction of a recognized sentence

FIG. 10

DEEP LEARNING-BASED AUTOMATIC GESTURE RECOGNITION METHOD AND SYSTEM

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Jun. 29, 2018, and assigned Serial No. 10-2018-0075133, the entire disclosure of which is hereby incorporated by reference.

TECHNICAL FIELD OF THE INVENTION

The present disclosure relates generally to artificial intelligence (AI)-related technology, and more particularly, to a method and a system for automatically recognizing gestures such as sign language by utilizing an AI model.

BACKGROUND OF THE INVENTION

Computer vision-based gesture recognition technology uses a method of receiving an RGB image and depth information simultaneously, and extracting feature points from the inputted information and matching the feature points. This technology has problems that it greatly depends on depth information and there are many environmental limitations.

The rapid development of AI technology enables automatic recognition of gestures such as sign language from an input image. Related-art deep learning-based sign language recognition technologies follow the End-to-End training method which directly converts an image to sign language (text).

However, this method has a problem that a neutral network should be trained with many training images and data to achieve satisfactory recognition. In the case of recognition of sign language, more than one million training images are generally required.

Furthermore, even if the neural network is well trained and is applied to a real application program, it may be difficult to correctly recognize when a greatly different image from training images is inputted.

SUMMARY OF THE INVENTION

To address the above-discussed deficiencies of the prior art, it is a primary aspect of the present disclosure to provide robust and high-performance automatic gesture recognition method and system, which are not influenced by an environment and a condition even while using less training data.

According to an embodiment of the present disclosure to achieve the above-described aspects, a training method includes: extracting a plurality of contours from an input image; generating training data by normalizing pieces of contour information forming each of the contours; and training an AI model for gesture recognition by using the generated training data.

In addition, the contours may overlap one another.

In addition, the pieces of contour information may be pieces of information regarding feature points extracted to derive the contours.

In addition, the pieces of information regarding the feature points may include pieces of coordinate information of the feature points.

In addition, the generating the training data may include normalizing the pieces of contour information through arithmetic operations using a mean of the pieces of coordinate information of the pieces of coordinate information forming each contour, and a standard deviation.

In addition, the generating the training data may include generating the training data by adding pieces of reliability information of the pieces of contour information to the normalized pieces of coordinate information.

In addition, the training method may further include: extracting feature data from each of regions including the contours; and adding the extracted feature data to the generated training data, and the training may include training the AI model by using the training data to which the feature data is added.

In addition, the extracting may include extracting the feature data by using a neural network.

In addition, a dimension of the feature data may be identical to a dimension of the pieces of contour information.

In addition, the training method may further include augmenting the generated training data, and the training may include training the AI model by using the augmented training data.

In addition, the augmenting may include additionally generating training data by randomly changing the normalized contour information forming the training data.

In addition, the augmenting may include changing the normalized contour information within a limited range.

In addition, the limited range may be a contour region including the contour information.

In addition, the limited range may be a limited distance from the contour information to another contour information.

According to another embodiment of the present disclosure, a gesture recognition system includes: an input unit configured to receive an image; and a processor configured to extract a plurality of contours from an image inputted through the input unit, to generate training data by normalizing pieces of contour information forming each of the contours, and to train an AI model for gesture recognition by using the generated training data.

According to another embodiment of the present disclosure, a gesture cognition method includes: extracting a plurality of contours from an input image; generating inference data by normalizing pieces of contour information forming each of the contours; and recognizing a gesture by inputting the generated inference data to an AI model for gesture recognition.

According to another embodiment of the present disclosure, a gesture recognition system includes: an input unit configured to receive an image; and a processor configured to extract a plurality of contours from an image inputted through the input unit, to generate inference data by normalizing pieces of contour information forming each of the contours, and to recognize a gesture by inputting the generated inference data to an AI model for gesture recognition.

According to another embodiment of the present disclosure, a computer-readable recording medium records a program for performing a training method, the training method includes: extracting a plurality of contours from an input image; generating training data by normalizing pieces of contour information forming each of the contours; and training an AI model for gesture recognition by using the generated training data.

According to embodiments of the present disclosure as described above, robust and high-performance automatic gesture recognition can be performed, without being influenced by an environment and a condition even while using less training data.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The present disclosure will be described in more detail with reference to the accompanying drawings.

Figure 1:
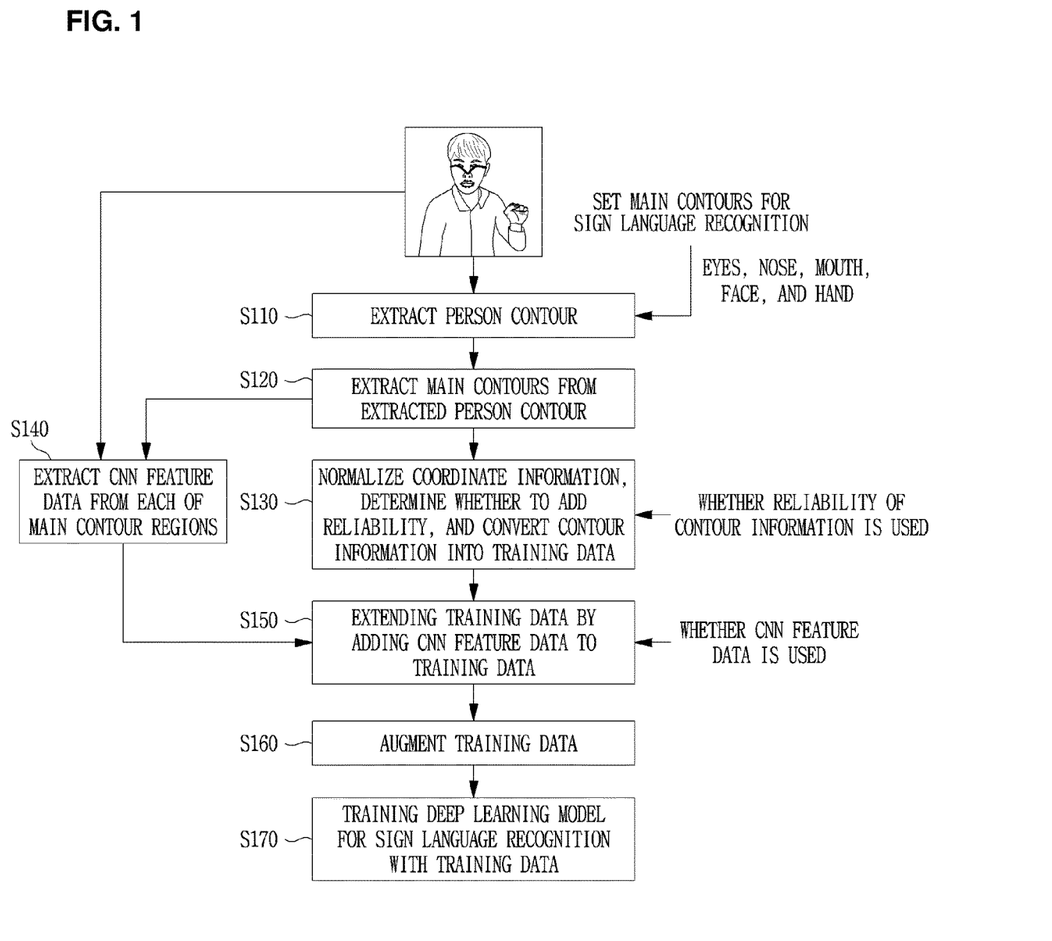
FIG. 1 is a flowchart provided to explain a training method for automatic gesture recognition according to an embodiment of the present disclosure.

FIG. 1 is a flowchart provided to explain a training method for automatic gesture recognition according to an embodiment of the present disclosure.

The training method for automatic gesture recognition according to an embodiment uses only RGB images without depth information, and aims at performing robust and high-performance gesture recognition which uses less training data and is not influenced by an environment and a condition, and automatically recognizes gestures such as sign language based on deep learning.

In explaining automatic sign language recognition in an embodiment, the sign language is merely an example of a gesture. The technical concept of the present disclosure can be applied when other gestures than sign language are recognized.

The training method for automatic gesture recognition according to an embodiment extracts main contours necessary for sign language recognition from an input image, classifies contour information according to each main contour and normalizes the contour information, and then generates training data by adding reliability of the contour information (reliability of contour information as feature points forming the main contours).

In addition, the training method according to an embodiment extends the training data by adding feature data regarding main contour regions (rectangular regions including the main contours), and increases the amount of training data by augmenting the extended training data.

Specifically, as shown in FIG. 1, a person contour is extracted from an inputted training image (S110), and main contours necessary for sign language recognition are extracted from the extracted person contour (S120).

An upper image in FIG. 1 shows a result of extracting a person contour at step S110. The main contours necessary for sign language recognition, extracted at step S120, include an eyes, nose, mouth contour, a facial contour, and a hand contour. The result of extracting the main contours is illustrated in FIG. 2.

Figure 2:
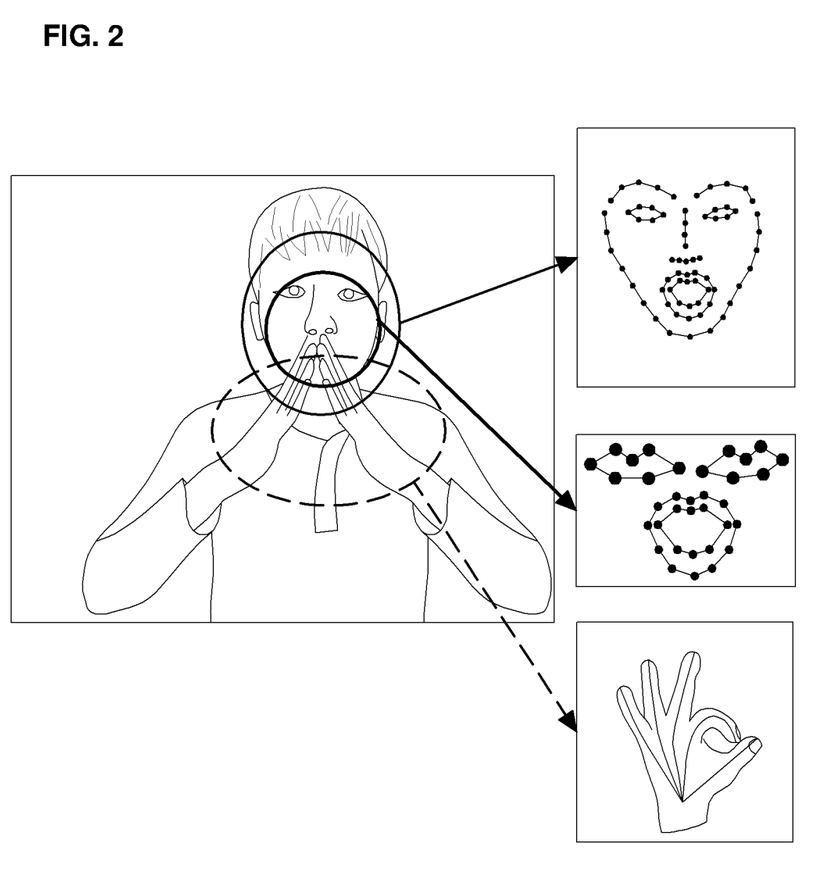
FIG. 2 is a view illustrating a result of extracting main contours.

As shown in FIG. 2, the regions of the main contours may overlap one another in part or entirely. As shown in FIG. 2, the eyes, nose, mouth contour entirely overlaps the facial contour, and the hand contour partly overlaps the eyes, nose, mouth contour and the facial contour.

As shown in the right view of FIG. 2, the main contours are formed of a plurality of pieces of contour information. The pieces of contour information may correspond to pieces of information regarding feature points which are extracted to drive the main contours. The contour information may include an x-coordinate, a y-coordinate, and reliability regarding a feature point.

Reference is made back to FIG. 1.

When the main contours are extracted, the pieces of contour information are classified according to each main contour, and coordinate information of the pieces of contour information is normalized, and it is determined whether the reliability of the contour information is added to training data or not, and the contours information is converted into training data (S130).

Pieces of contour information of the eyes, nose, mouth contour are normalized by using only the pieces of contour information of the eyes, nose, mouth contour, pieces of contour information of the facial contour are normalized by using only the pieces of contour information of the facial contour, and pieces of contour information of the hand contour are normalized by using only the pieces of contour information of the hand contour.

The normalizing is pre-processing for analyzing statistical features of the pieces of contour information with reference to the main contours, and processing the pieces of contour information based on the result of analyzing, and corresponds to a process of converting into training data for deep learning.

The contour information robustly includes an individual data feature. Therefore, when the contour information is used for training as it is without being processed, there is a problem that training is not well achieved. The normalizing is a solution to this problem.

It is optional whether the reliability of the contour information is added to the training data, and for example, it may be determined whether the reliability is added to the training data based on user's setting. When the reliability of the contour information is added, the training data is formed of normalized x-coordinate, normalized y-coordinate, and reliability, and, when the reliability of the contour information is not added, the training data is formed of normalized x-coordinate and normalized y-coordinate.

A method for converting the contour information into the training data will be described in detail with reference to FIG. 3.

In the meantime, feature data are extracted from each of the main contour regions (rectangular regions including the main contours) by using a convolutional neural network (CNN) (S140).

Specifically, feature data are extracted from the eyes, nose, mouth contour region, feature data are extracted from the facial contour region, and feature data are extracted from the hand contour region. A method for extracting the features will be described in detail with reference to FIG. 4.

The training data is extended by adding the feature data extracted at step S140 to the training data converted at step S130 (S150). Adding the feature data is to enhance the performance of sign language recognition, and is of help to sign language recognition robust to an environment and a deviation.

Herein, adding the feature data is optional, and may be performed based on user's setting, for example, A method for adding the feature data will be described in detail with reference to FIG. 5.

After that, new various training data are generated by augmenting the training data extended at step S150 (S160).

Augmenting the training data is to enhance training performance by increasing the amount of training data, and is useful particularly when the amount of training data to be provided is small. A method for augmenting the training data will be described in detail with reference to FIG. 6.

A deep learning model for sign language recognition is trained by inputting the training data obtained by the above-described process to the deep learning model (S170).

Hereinafter, the method for converting the contour information into the training data as at step S130 described above will be described in detail with reference to FIG. 3. FIG. 3 is a view provided to explain a method for normalizing the contour information in detail.

Figure 3:
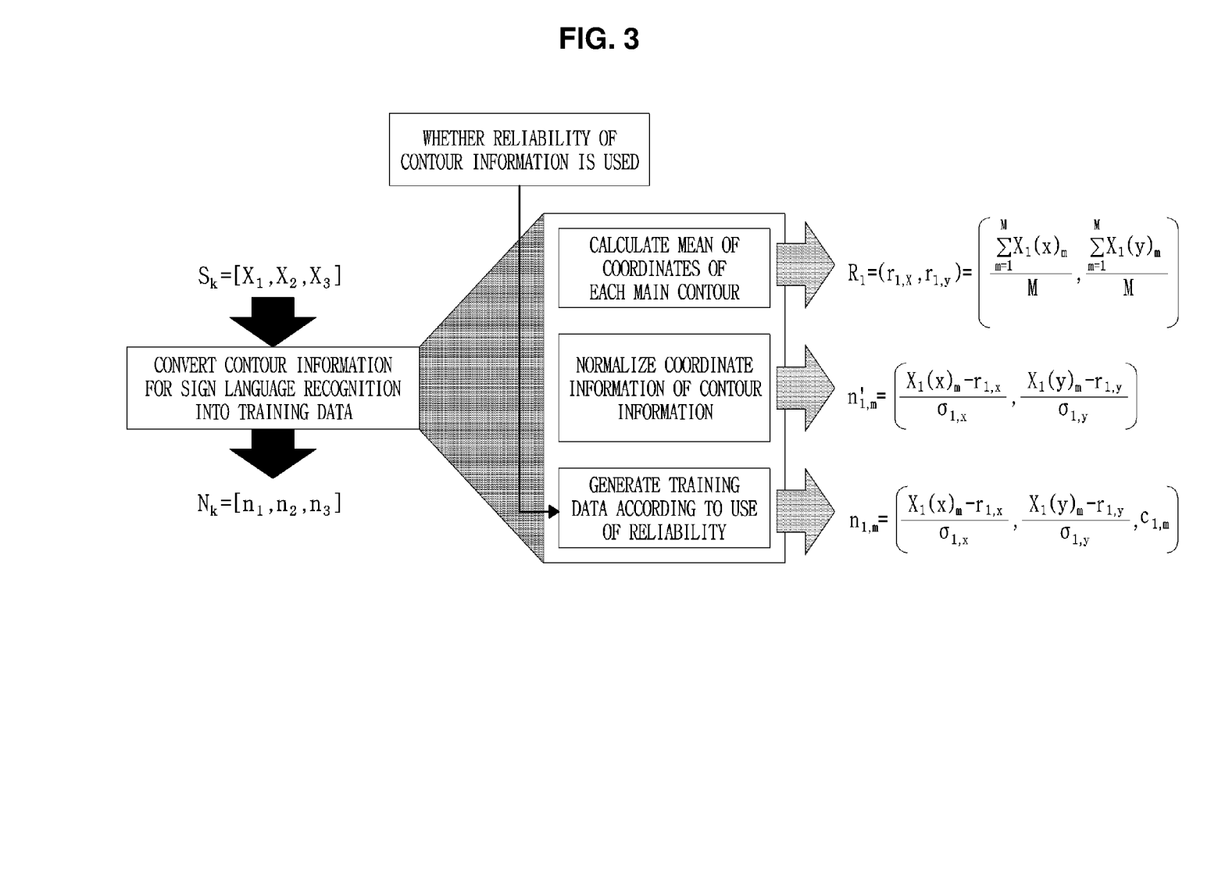
FIG. 3 is a view provided to explain a method for normalizing contour information in detail.

In FIG. 3, $S_k$ is pieces of contour information extracted form an input image, and for example, $X_1$ is pieces of contour information of the eyes, nose, mouth contour, $X_2$ is pieces of contour information of the facial contour, and $X_3$ is pieces of contour information of the hand contour.

$X_1$ is formed of $X(x)_i$, $X_1(y)_i$, $c_{1,i}$, where $1 \leq i \leq M$, M is the number of pieces of contour information included in the eyes, noise, mouth contour, $X(x)_i$ is an x-coordinate of the i-th contour information, $X_1(y)_i$ is a y-coordinate of the i-th contour information, and $c_{1,i}$ is reliability of the i-th contour information. The definitions described above are equally applied to $X_2$ and $X_3$.

In FIG. 3, $N_k$ is training data which is generated by being converted from the contour information. For example, $n_1$ is training data which is generated from the pieces of contour information of the eyes, nose, mouth contour, $n_2$ is training data which is generated from the pieces of contour information of the facial contour, and $n_3$ is training data which is generated from the pieces of contour information of the hand contour.

To generate the training data $N_k$ from the pieces of contour information $S_k$ extracted from the input image, a mean of all of the x-coordinates forming $X_1$ is calculated, and then the x-coordinates are normalized by subtracting the mean and dividing by the standard deviation, and a mean of all of the y-coordinates forming $X_1$ is calculated, and then the y-coordinates are normalized by subtracting the mean and dividing by the standard deviation. This process is equally performed with respect to $X_2$ and $X_3$.

Next, the contour information is converted into the training data $N_k$ by adding the reliability of the contour information to the normalized x-coordinates and y-coordinates of the contour information. As described above, the reliability of the contour information may not be added to the training data.

Figure 4:
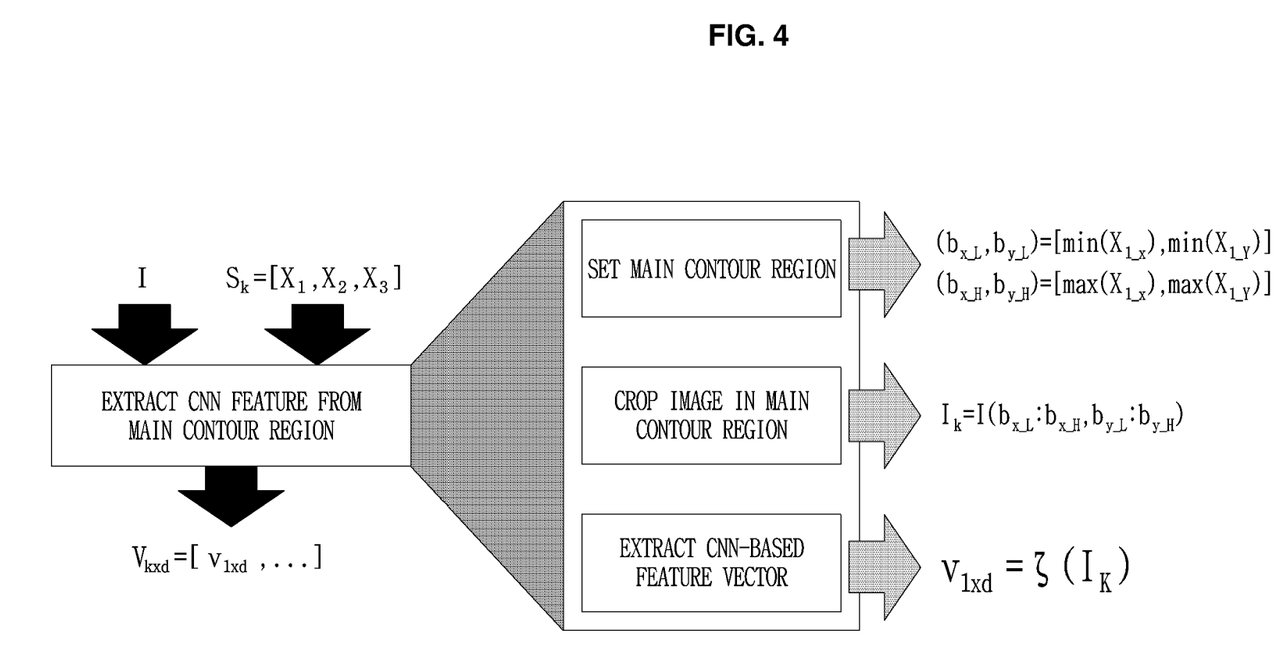
FIG. 4 is a view provided to explain a feature data extraction method.

Hereinafter, the method for extracting the feature data at step S140 will be described in detail with reference to FIG. 4. FIG. 4 is a view provided to explain the method for extracting the feature data.

To generate the feature data to be added to the training data, feature data are extracted from each of the main contour regions by using the CNN (CNNs features).

Specifically, main contour regions are set in an input image I, which is an RGB image, with reference to the pieces of contour information $S_k$. When a minimum x-coordinate and a maximum x-coordinate, and a minimum y-coordinate and a maximum y-coordinate are found on the coordinate systems corresponding to each main contour, a rectangle connecting these values may be set to the main contour region.

An image region corresponding to the set main contour region is cropped, and then a d-dimensional CNN feature vector, which is feature data, is extracted by using the CNN which is a kind of image processing deep learning engine. d may be determined to a value which can match the dimensions of the contour information and the feature data.

Hereinafter, the method for adding the feature data to the training data at step S150 will be described in detail with reference to FIG. 5. FIG. 5 is a view provided to explain the method for adding the feature data.

Figure 5:
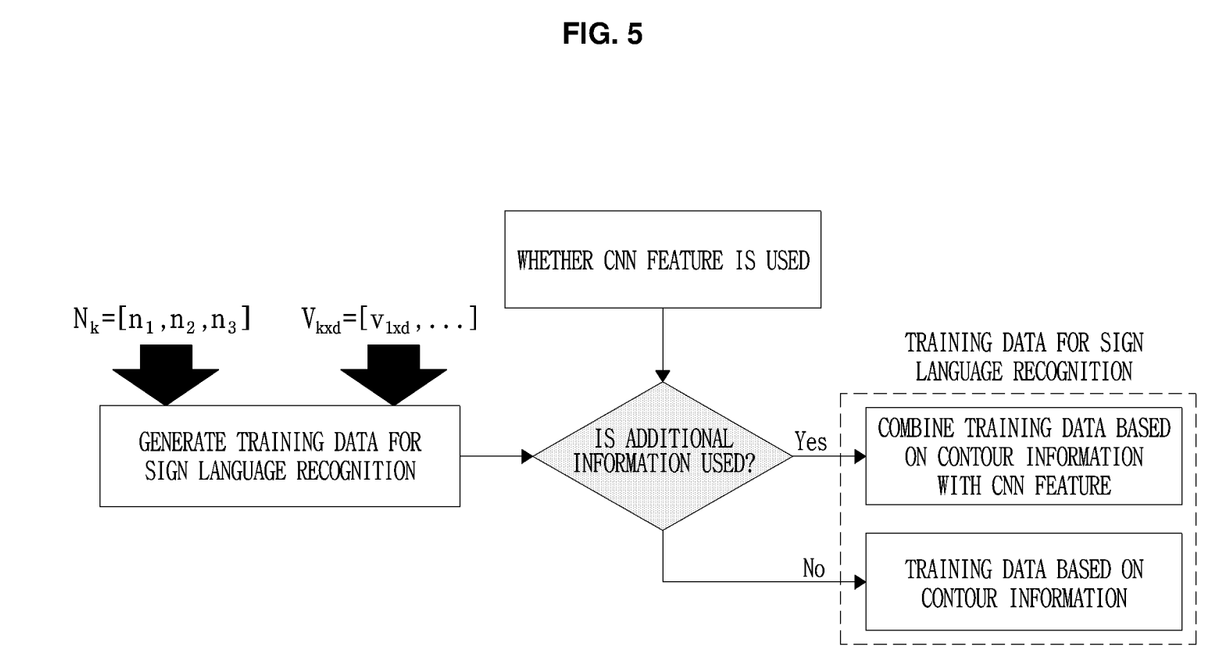
FIG. 5 is a view provided to explain a feature data addition method.

FIG. 5 illustrates a process of extending the training data based on the contour information and the feature data.

As shown in FIG. 5, final training data may be generated by combining the training data based on the contour information $N_k$ with the feature data $V_{k \times d}$, or the training data based on the contour information $N_k$ without being combined with the feature data $V_{k \times d}$ may be used as final training data.

Figure 6:
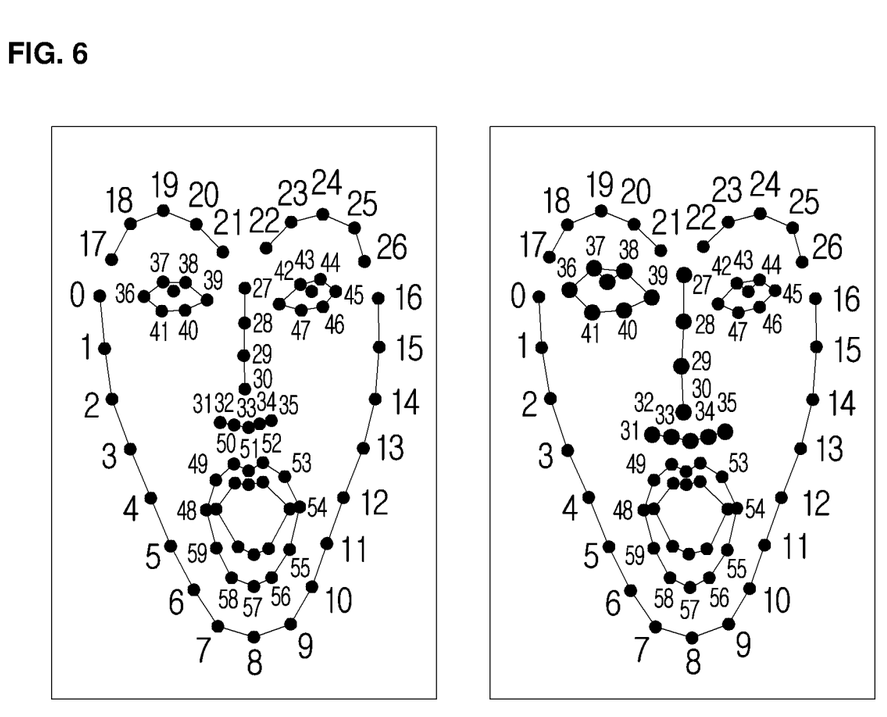
FIG. 6 is a view provided to explain a training data augmentation method.

Hereinafter, the method for augmenting the training data at step S160 will be described in detail with reference to FIG. 6. FIG. 6 is a view provided to explain the method for augmenting the training data.

In FIG. 6. the left view illustrates a facial contour which is extracted from an input image and is normalized, and the right view illustrates a new facial contour which is generated by augmenting the normalized facial contour of the left view.

As shown in FIG. 6, the facial contour of the right view is generated by randomly changing the normalized x-coordinates and the normalized y-coordinates which form the normalized contour information of the left view.

However, the normalized x-coordinates and the normalized y-coordinates may be changed within a limited range.

That is, the change is not allowed to depart from the facial contour region, that is, the corresponding main contour region.

Furthermore, a change of making the normalized x-coordinates and the normalized y-coordinates depart from adjacent contour information by more than a specified distance is not allowed. This is to prevent the facial contour from departing from a normal face due to a big change.

In the facial contour of the right view of FIG. 6, one eye is relatively larger than the other, and a ratio of the nose and the philtrum in the face increases, but the change on the coordinates is made only within a limited range and thus the facial contour is still interpreted as a human face.

Up to now, the training process for automatic sign language recognition has been described. Thereafter, automatic sign language recognition is performed by using the trained deep learning model.

The automatic sign language recognition process is the same as the training method except for that inference data extracted from a sign language image to be recognized, rather than the training data, is used.

Figure 7:
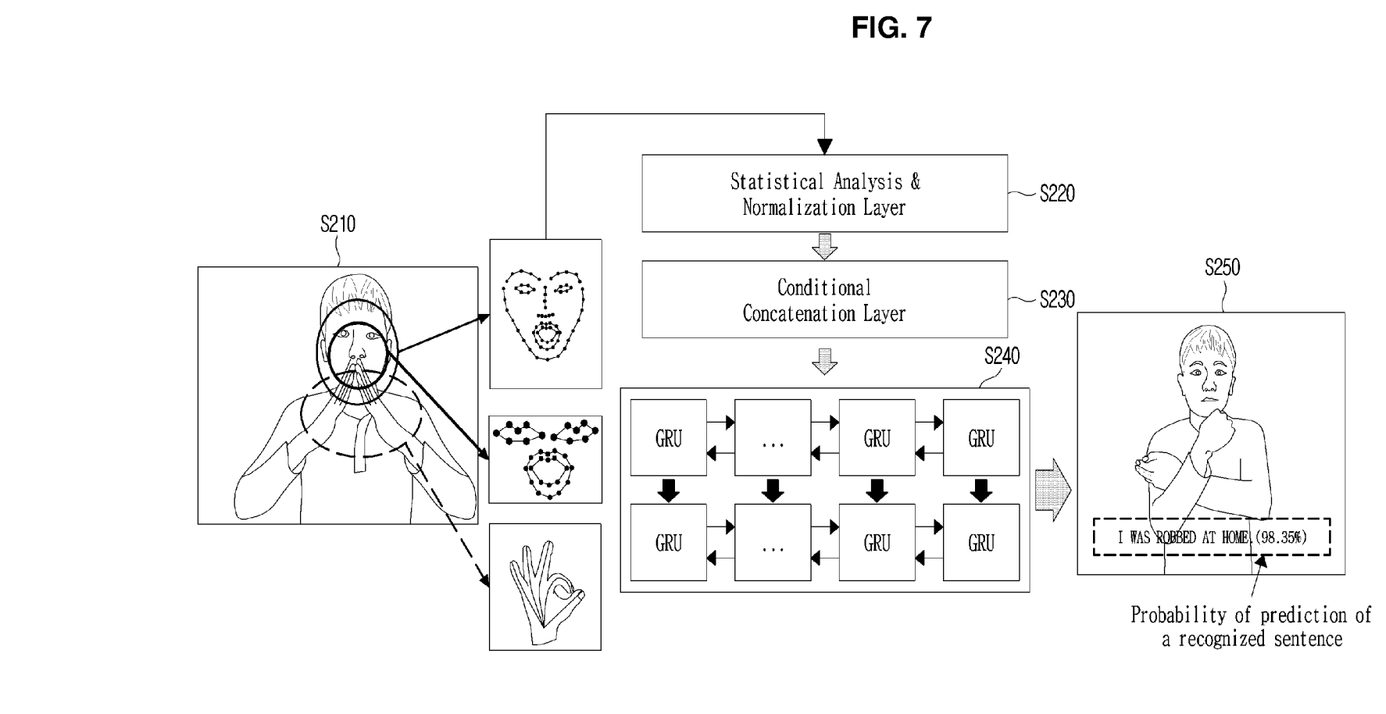
FIG. 7 is a view provided to explain an automatic sign language recognition method according to another embodiment of the present disclosure.

FIG. 7 is a view provided to explain a automatic sign language recognition method according to another embodiment of the present disclosure.

To automatically recognize sign language, a person contour is extracted from an input image as shown in FIG. 7, and main contours necessary for sign language recognition are extracted from the extracted person contour (S210).

Next, pieces of contour information are classified according to each main contour, and pieces of coordinate information of the contour information are normalized, and the contour information is converted into inference data by adding reliability of the contour information to the training data (or by not adding) (S220).

In addition, feature data are extracted from each of the main contour regions by using the CNN, and the inference data is extended by adding the feature data to the inference data generated at step S220 (S230). Step S230 may be selectively performed.

Thereafter, sign language is recognized by inputting the inference data obtained by the above-described process to a deep learning model for sign language recognition (S240), and the recognized sign language is outputted (S250).

Figure 8:
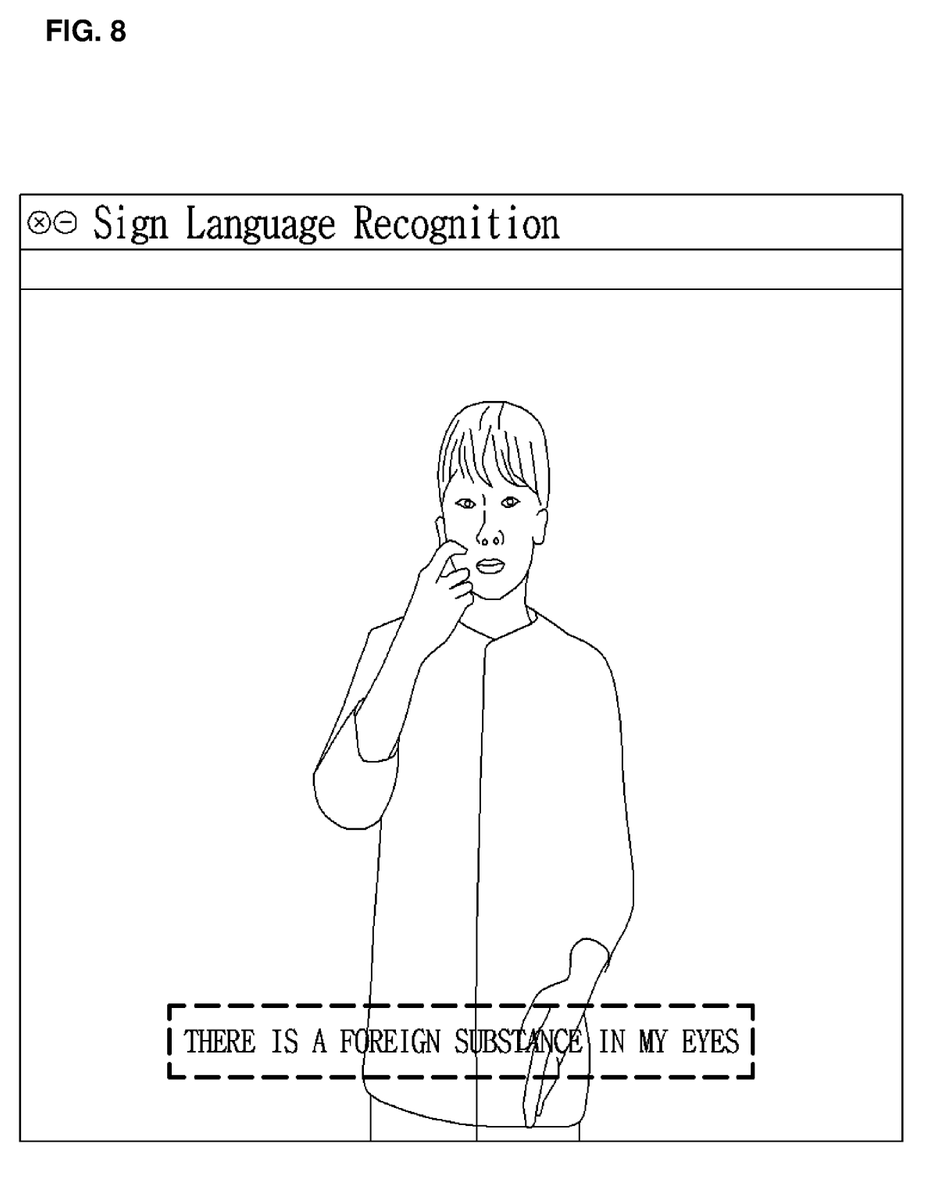
FIGS. 8 and 9 are views provided to explain results of recognizing sign language by using a deep learning model which is trained in a training method according to an embodiment of the present disclosure.
Figure 9:
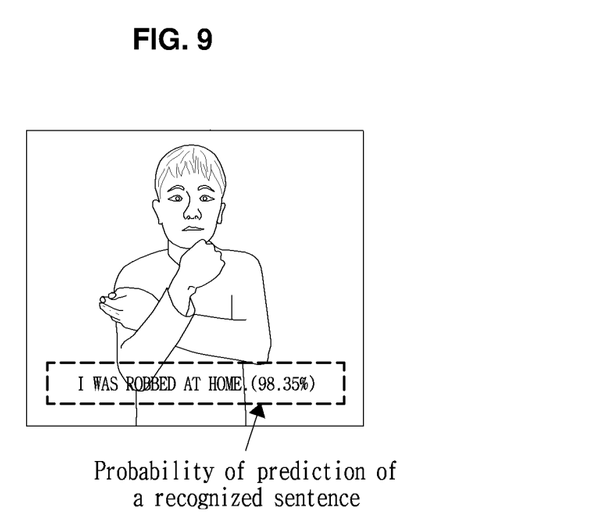

FIGS. 8 and 9 are views provided to explain the results of recognizing sign language by using the deep learning model which is trained in the training method according to embodiments.

As a result of learning from the training data which is formed of 105 sentences, 400 words, and 11,000 videos in total using the method according to embodiments of the present disclosure, and performing sign language recognition, recognition accuracy of sign language sentences reaches about 92.5%, and recognition accuracy of sign language reaches about 89%. Compared with the accuracy of related-art technology of about 80%, the method according to embodiments of the present disclosure guarantees high performance, extendability, and stability.

Figure 10:
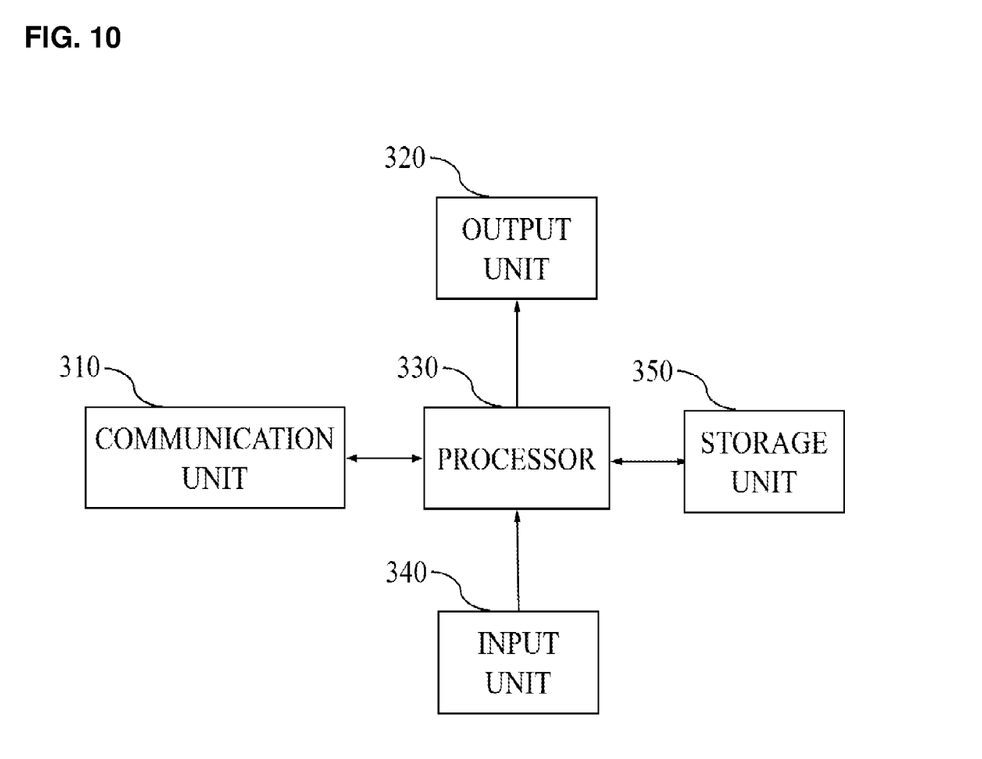
FIG. 10 is a block diagram of an automatic sign language recognition system according to another embodiment of the present disclosure.

FIG. 10 is a block diagram of an automatic sign language recognition system according to another embodiment of the present disclosure. The automatic sign language recognition system according to another embodiment may be implemented by a computing system including a communication unit 310, an output unit 320, a processor 330, an input unit 340, and a storage unit 350.

The communication unit 310 is a communicating means for receiving a sign language video and sign language data for training, and a recognition video to be recognized from an external device and an external network.

The input unit 340 is an inputting means for receiving a user setting command, and the output unit 320 is a display for displaying training/sign language videos, and a process of automatic sign language recognition and results.

The processor 330 performs a training process for automatic sign language recognition by performing the method illustrated in FIG. 1, and performs automatic sign language recognition by performing the method illustrated in FIG. 7.

The storage unit 350 provides a storage space necessary for the operation of the processor 330.

Up to now, the automatic sign language recognition method and system have been described in detail with reference to preferred embodiments.

Embodiments of the present disclosure provide robust and high performance automatic gesture (sign language) recognition method and system, which are not influenced by an environment and a condition even while using less training data.

The technical concept of the present disclosure may be applied to a computer-readable recording medium which records a computer program for performing the apparatus and the method according to embodiments of the present disclosure. In addition, the technical concept according to various embodiments of the present disclosure may be implemented in the form of a computer-readable code recorded on a computer-readable recording medium. The computer-readable recording medium may be any data storage device from which data can be read by a computer and which can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A training method, comprising:
   extracting a plurality of contours from an input image;
   generating training data by normalizing pieces of contour information forming each of the contours, wherein the generating the training data comprises generating the training data by adding pieces of reliability information of the pieces of contour information to the normalized pieces of coordinate information; and
   training an AI model for gesture recognition by using the generated training data.

2. The training method of claim 1, wherein the contours overlap one another.

3. The training method of claim 1, wherein the pieces of contour information are pieces of information regarding feature points extracted to derive the contours.

4. The training method of claim 3, wherein the pieces of information regarding the feature points comprise pieces of coordinate information of the feature points.

5. The method of claim 4, wherein the generating the training data comprises normalizing the pieces of reference contour information through arithmetic operations using a mean of the pieces of reference coordinate information of the pieces of reference contour information forming each contour, and a standard deviation.

6. The training method of claim 1, further comprising:
extracting feature data from each of regions comprising the contours; and
adding the extracted feature data to the generated training data,
wherein the training comprises training the AI model by using the training data to which the feature data is added, and
wherein the extracting comprises extracting the feature data by using a neural network.

7. The training method of claim 1, further comprising augmenting the generated training data,
wherein the training comprises training the AI model by using the augmented training data.

8. The training method of claim 7, wherein the augmenting comprises additionally generating training data by randomly changing the normalized contour information forming the training data.

9. A training method, comprising:
extracting a plurality of contours from an input image;
generating training data by normalizing pieces of contour information forming each of the contours; and
training an AI model for gesture recognition by using the generated training data, wherein the generating the training data comprises normalizing the pieces of contour information through arithmetic operations using a mean of the pieces of coordinate information of the pieces of contour information forming each contour, and a standard deviation.

10. A training method, comprising:
extracting a plurality of contours from an input image;
extracting feature data from each of regions comprising the contours;
generating training data by normalizing pieces of contour information forming each of the contours;
adding the extracted feature data to the generated training data; and
training an AI model for gesture recognition by using the generated training data to which the feature data is added, wherein the extracting comprises extracting the feature data by using a neural network.

11. The training method of claim 10, wherein a dimension of the feature data is identical to a dimension of the pieces of contour information.

12. A training method, comprising:
extracting a plurality of contours from an input image;
generating training data by normalizing pieces of contour information forming each of the contours;
training an AI model for gesture recognition by using the generated training data; and
augmenting the generated training data,
wherein the training comprises training the AI model by using the augmented training data, wherein the augmenting comprises additionally generating training data by randomly changing the normalized contour information forming the training data.

13. The training method of claim 12, wherein the augmenting comprises changing the normalized contour information within a limited range.

14. The training method of claim 13, wherein the limited range is a contour region comprising the contour information.

15. The training method of claim 14, wherein the limited range is a limited distance from the contour information to another contour information.

16. A gesture recognition system comprising:
an input unit configured to receive an image; and
a processor configured to:
extract a plurality of contours from an image inputted through the input unit;
generate training data by normalizing pieces of contour information forming each of the contours, wherein the generating the training data comprises generating the training data by adding pieces of reliability information of the pieces of contour information to the normalized pieces of coordinate information; and
train an AI model for gesture recognition by using the generated training data.

17. A gesture cognition method comprising:
extracting a plurality of contours from an input image;
generating inference data by normalizing pieces of contour information forming each of the contours; and
recognizing a gesture by inputting the generated inference data to an AI model for gesture recognition, wherein the AI model is trained in advanced using training data, the training data being generated by adding reliability information of pieces of reference contour information to normalized pieces of reference coordinate information.

18. The method of claim 17, wherein the contours overlap one another.

19. The method of claim 17, wherein the pieces of contour information are pieces of information regarding feature points extracted to derive the contours.

20. The method of claim 19, wherein the pieces of information regarding the feature points comprise pieces of coordinate information of the feature points.

* * * * *